G. A. WEBSTER.
REDUCING WHEEL.
APPLICATION FILED APR. 4, 1910.

973,596.

Patented Oct. 25, 1910.
2 SHEETS—SHEET 1.

WITNESSES:
M. E. Flaherty.
George Langton.

INVENTOR:
George A. Webster
by his attys
Clarkes Raymond & Crate

G. A. WEBSTER.
REDUCING WHEEL.
APPLICATION FILED APR. 4, 1910.

973,596.

Patented Oct. 25, 1910.
2 SHEETS—SHEET 2.

UNITED STATES PATENT OFFICE.

GEORGE A. WEBSTER, OF SOMERVILLE, MASSACHUSETTS, ASSIGNOR TO STAR BRASS MANUFACTURING COMPANY, OF BOSTON, MASSACHUSETTS, A CORPORATION OF MASSACHUSETTS.

REDUCING-WHEEL.

973,596.  Specification of Letters Patent.  Patented Oct. 25, 1910.

Application filed April 4, 1910. Serial No. 553,257.

*To all whom it may concern:*

Be it known that I, GEORGE A. WEBSTER, of Somerville, in the county of Middlesex and State of Massachusetts, a citizen of the United States, have invented a new and useful Improvement in Reducing-Wheels, of which the following is a full, clear, and exact description, reference being had to the accompanying drawings, forming a part of this specification, in explaining its nature.

The object of my invention is to provide a wheel or device of the above character having a simple, strong, compact structure on which both the engine cord and indicator cord connecting therewith will act at all times to wind or unwind evenly without overlapping and without disturbing or changing the planes of the running portions of the cords, especially the indicator cord, or those portions thereof which run between the device and the parts with which the cords respectively connect.

It is a further and especially essential object of my invention to provide a wheel or device which will operate at all times to effect a quick responsive return of the operating parts and prevent the formation of slack in the engine cord connecting with the device.

My invention can best be seen and understood by reference to the drawings in which—

Figure 1:
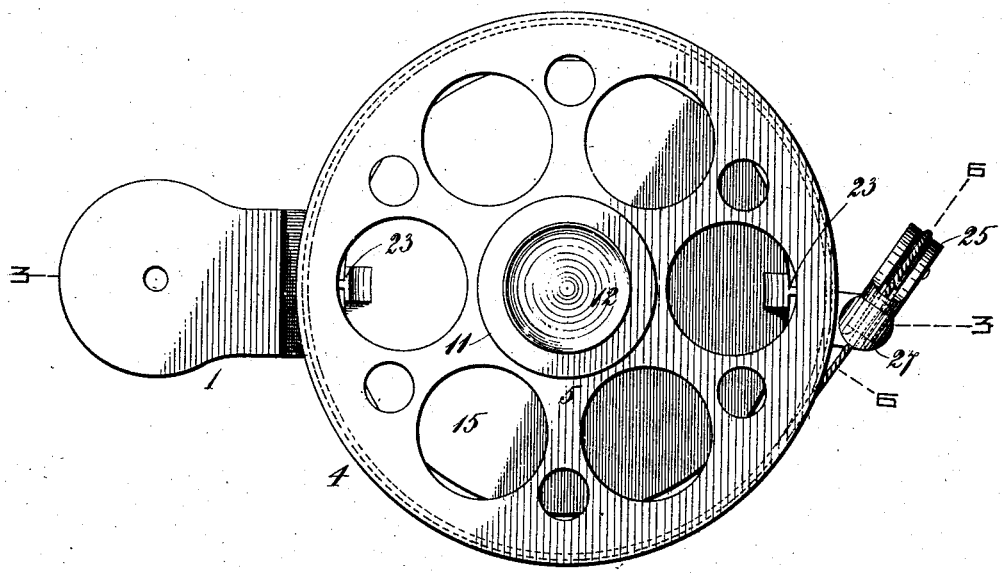
Figure 2:
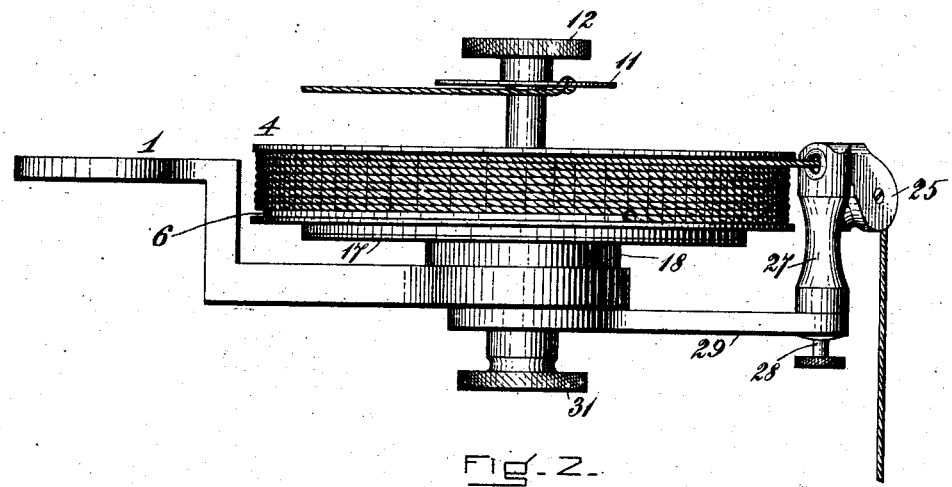
Figure 3:
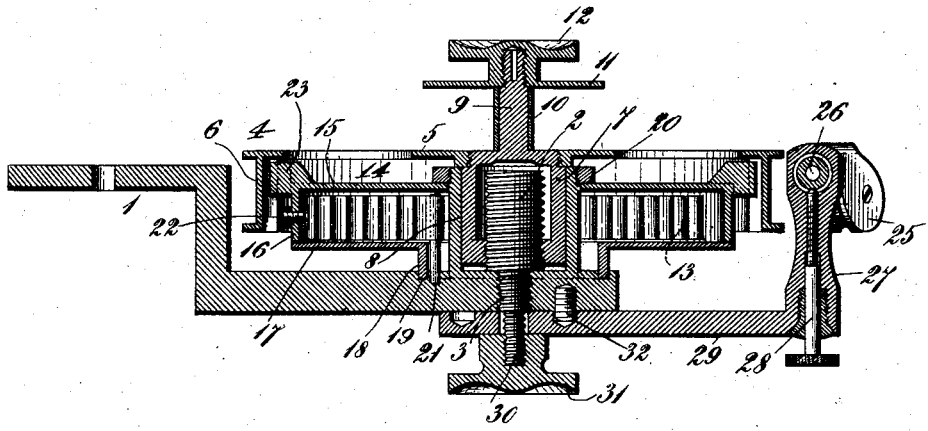
Figure 4:
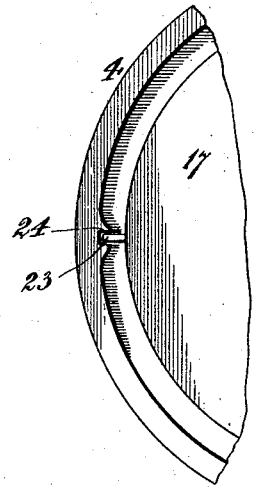
Figure 5:
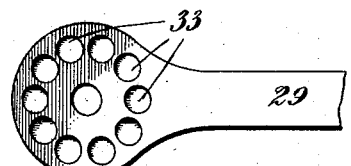
Figure 6:
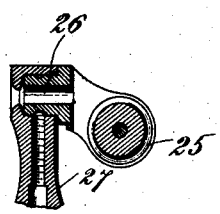

Figure 1 shows the device in plan. Fig. 2 shows the same in side elevation. Fig. 3 is a cross section on the line 3—3 of Fig. 1. Figs. 4 and 5 are plans showing details of construction to which reference will hereinafter be made. Fig. 6 is a section of a detail of construction to which also especial reference will hereinafter be made.

Referring to the drawings:—1 is a bracket supporting the apparatus and by which it is secured to any proper fixture or support.

2 is a post exteriorly threaded and which is fixed to the bracket 1 preferably by a threaded shank 3.

4 is the engine cord wheel of which 5 represents the body and 6 the depending rim of the wheel on which the engine cord is wound. The wheel is provided also with a hub 7 interiorly threaded (preferably only in part) to turn upon the threaded exterior of the post 2 wherefore the wheel will reciprocate up and down on the post as the wheel is turned in reverse directions. Attention is also directed to the fact that the hub turns within an annular outer bearing 8 affixed to the bracket 1. This for the purpose of centering the hub and reducing friction which would otherwise come upon the threads of the hub and post and which might prevent a proper operation of the device.

Affixed to the engine cord wheel or rather to the hub of the wheel and movable therewith is a spindle 9. This spindle or the sleeve 10 arranged upon it (constituting practically a part of the spindle) forms the part or element on which the indicator cord is wound. This cord is prevented from running off the spindle by a guard 11 which forms a part of a nut 12 having threaded attachment with the end of the spindle.

By the means thus far described there is simultaneously effected both a rotary and reciprocal movement of the engine cord wheel and of the spindle on which the indicator cord is wound as these parts are operated to turn in reverse directions during the operation of the device. In this connection it may be explained that in order to secure a proper even winding or unwinding of the respective cords it is necessary of course, as is well known to those skilled in the art, that the size of the respective cords should bear proper relationship to the size of the threads by which the reciprocal movement of the engine cord wheel and indicator cord spindle is effected as aforesaid.

Referring now to the means for effecting the return of the rotary and reciprocating parts when operated as is customary in devices of this kind, attention is first directed to the coil spring 13 contained within a rotary casing 14. The casing 14 is annular in form and, as will be further explained, is arranged to rotate around the bearing 8 affixed to the bracket 1. The casing comprises a top plate 15 having an inside lateral bearing against the bearing 8; an outer side or rim portion 16 and a bottom plate 17. The bottom 17 of the casing is provided with a depending annular flange 18 which extends to rest upon or engage the bracket 1 and turn within an annular socket 19 formed in the bracket. The casing is retained by a nut 20 arranged upon the end of the bearing 8 and loosely engaging the top plate 15 of the casing.

The inner end of the spring 13 is fixed to a pin 21 secured to the bracket 1 and extending therefrom just alongside the bearing 8 and into the cavity of the box. In this connection it will be observed that in order to provide for the affixing of the pin 21 to the bracket and still enable the casing 14 to properly rotate the depending flange 19 thereof is arranged just outside the pin. The outer end of the spring 13 is secured to the interior of the outer side portion or rim 16 of the casing by a pin 22. The spring is tightened as its box is rotated and the box is rotated by the rotation of the engine cord wheel consequent upon the unwinding of the engine cord connecting therewith. For the purpose of enabling such rotation of the box to be effected and at the same time permitting of a proper reciprocal movement of the engine cord wheel and connecting parts the box is provided with a feather 23 which enters and operates within a slot 24 formed on the inside of the rim 6 of the engine cord wheel.

The engine cord is guided onto and off the engine cord wheel by a guide 25 affixed to an eye 26 over which guide and through which eye the cord is adapted to run as it winds onto or off the wheel. The eye 26 is arranged within a socket formed in the head of a post 27 and within which socket the eye may be adjustably turned for varying the angular position of the guide. The eye is secured when in adjusted position by means of a binding screw 28 extending through the post. The post is arranged upon an arm 29 secured to the under side of the bracket 1. As shown the arm 29 is secured to the bracket by means of an auxiliary shank 30 extending from the shank 3 secured to the post 2. The shank 30 extends through the arm and has on the end thereof a binding nut 31 which acts to hold the arm 29 against the under side of the bracket. To prevent rotation of the arm and still permit of a rotary adjustment thereof I prefer to employ some positive means apart from the prevention of rotation by the mere frictional contact between the arm and bracket. The means shown comprises a plug 32 affixed to the bracket and which is adapted to enter any one of a series of openings 33 formed in the side of the arm adjacent the bracket.

In the operation of the device a pull on the engine cord will simultaneously affect both the engine cord wheel and the spindle on which the indicator cord is wound, causing these parts to be rotated and to rise or move longitudinally with respect to the post 2, the engine cord then becoming unwound from its wheel and the indicator cord becoming wound on its spindle. During this movement also the spring 13 will have become tightened, the rotation of the engine cord wheel imparting its rotary motion to the casing 14 containing the spring for tightening it through the feather and slot connection between these parts which enables the parts to rotate together yet permits of the wheel rising or moving longitudinally independently of the casing and spring. After the cessation of pull on the engine cord, the spring having become tightened will immediately act through the medium of its casing and feather connection to effect a reverse rotary movement of the engine cord wheel and indicator cord spindle, causing the engine cord to become wound upon the wheel and the indicator cord to unwind from the spindle which continues until pull upon the engine cord causes a further reverse movement of the parts as above explained.

It is obvious that various changes may be made in the construction embodying my invention without departing from the essential spirit of the invention.

Having thus fully described my invention, I claim and desire to secure by Letters Patent of the United States:—

1. In a reducing wheel, the combination with a supporting bracket, of a member or post affixed thereto, an engine cord wheel movable rotarily and reciprocable longitudinally on and with respect to said post as said wheel is rotated in reverse directions, a spring, means for fixedly securing one end of said spring, a rotary casing containing said spring and to which the other end of said spring is secured, which casing also is arranged to turn in the same direction as said wheel for contracting said spring as said wheel is turned in one direction or permit the retraction of said spring as said wheel turns in a reverse direction, and means connecting said wheel and casing whereby said casing may be turned by said wheel and said wheel move longitudinally on said post.

2. In a reducing wheel, the combination with a supporting bracket, of a member or post affixed thereto, an engine cord wheel movable rotarily and reciprocable longitudinally on and with respect to said post as said wheel is rotated in reverse directions, a spring, means for fixedly securing one end of said spring, a rotary casing containing said spring and to which the other end of said spring is secured, said casing also being concentric with said wheel to rotate in unison therewith, and means connecting said wheel and casing whereby said casing may be turned by said wheel and said wheel move longitudinally on said post.

3. In a reducing wheel, the combination with a supporting bracket, of a member or post affixed thereto, an engine cord wheel movable rotarily and reciprocal longitudinally on and with respect to said post as said wheel is rotated in reverse directions, an indicator cord spindle carried by and movable with said wheel, a spring, a casing containing said spring and to which casing one end of said spring is secured, means for securing the other end of said spring, and means connecting said wheel and casing whereby they may rotate together and said wheel move longitudinally with respect to said post and casing.

4. In a reducing wheel, the combination with a supporting bracket, of a member or post affixed thereto, an engine cord wheel movable rotarily and reciprocal longitudinally on and with respect to said fixed member or post as said wheel is rotated in reverse directions, an indicator cord spindle carried by and movable with said wheel, a spring, means for fixedly securing on one end of said spring from the point of said bracket, and means for securing the other end of said spring whereby it may become tightened as said wheel is turned.

5. In a reducing wheel, the combination with a supporting bracket, of an exteriorly threaded member or post affixed thereto, an engine cord wheel having a hub internally threaded to turn upon said post and said wheel be reciprocated longitudinally with respect to said post as said wheel is rotated in reverse directions, and an exterior bearing for said hub affixed to said bracket.

6. In a reducing wheel, the combination with a supporting bracket, of a member or post affixed thereto, an engine cord wheel movable rotarily and reciprocal longitudinally on and with respect to said post as said wheel is rotated in reverse directions, an indicator cord spindle carried by and movable with said wheel, a spring, a casing containing said spring and to which casing one end of said spring is secured, means for securing the other end of said spring from the point of said bracket, and means connecting said wheel and casing whereby they may rotate together and said wheel move longitudinally with respect to said post and casing.

7. In a reducing wheel, the combination with a supporting bracket, of an exteriorly threaded member or post affixed thereto, an engine cord wheel having a hub internally threaded to turn upon said post and said wheel be reciprocated longitudinally with respect to said post as said wheel is rotated in reverse directions, an indicator cord spindle carried by and movable with said wheel, an exterior bearing for the hub of said wheel affixed to said bracket, a spring, a casing containing said spring and to which casing one end of said spring is secured, means for securing the other end of said spring, and means connecting said wheel and casing whereby they may rotate together and said wheel move longitudinally with respect to said post and casing.

8. In a reducing wheel, the combination with a supporting bracket, of an exteriorly threaded member or post affixed thereto, an engine cord wheel having a hub internally threaded to turn upon said post and said wheel be reciprocated longitudinally with respect to said post as said wheel is rotated in reverse directions, an exterior bearing for said hub affixed to said bracket, a spring, a casing for said spring adapted and arranged to rotate upon said bracket and to which casing one end of said spring is secured, means for retaining the other end of said spring, and means connecting said wheel and casing whereby they may rotate together and said wheel move longitudinally with respect to said post and casing.

9. In a reducing wheel, the combination with a supporting bracket, of an exteriorly threaded member or post affixed thereto, an engine cord wheel having a hub internally threaded to turn upon said post and said wheel be reciprocated longitudinally with respect to said post as said wheel is rotated in reverse directions, an indicator cord spindle carried by and movable with said wheel, an exterior bearing for the hub of said wheel affixed to said bracket, a spring, a casing containing said spring mounted upon said bracket to rotate thereon and one end of which spring is secured to said casing, means for fixedly securing the other end of said spring from the point of said bracket, and means connecting said wheel and casing whereby they may rotate together and said wheel have a reciprocatory movement as aforesaid.

GEORGE A. WEBSTER.

Witnesses:
JOHN E. R. HAYES,
GEORGE LANGTON.